United States Patent
Lakshmeshwar

(10) Patent No.: US 11,922,191 B1
(45) Date of Patent: Mar. 5, 2024

(54) IDENTIFICATION OF MISSING CONTENT FEATURES IN RENDERED USER INTERFACES

(71) Applicant: Amazon Technologies, Inc., Seattle, WA (US)

(72) Inventor: Shreekanth Pandurang Lakshmeshwar, Bangalore (IN)

(73) Assignee: AMAZON TECHNOLOGIES, INC., Seattle, WA (US)

(*) Notice: Subject to any disclaimer, the term of this patent is extended or adjusted under 35 U.S.C. 154(b) by 165 days.

(21) Appl. No.: 17/335,481

(22) Filed: Jun. 1, 2021

(51) Int. Cl.
 G06F 9/451 (2018.01)
 G06F 9/54 (2006.01)
 G06F 11/34 (2006.01)
 H04L 67/10 (2022.01)

(52) U.S. Cl.
 CPC .............. *G06F 9/452* (2018.02); *G06F 9/542* (2013.01); *G06F 11/3476* (2013.01); *H04L 67/10* (2013.01)

(58) Field of Classification Search
 CPC ...... G06F 9/452; G06F 9/542; G06F 11/3476; H04L 67/10; H04L 67/01
 See application file for complete search history.

(56) References Cited

U.S. PATENT DOCUMENTS

| | | | |
|---|---|---|---|
| 2007/0083813 A1* | 4/2007 | Lui | G06F 11/3612 709/224 |
| 2015/0378878 A1* | 12/2015 | Sadasivam | G06F 8/38 717/125 |
| 2016/0034441 A1* | 2/2016 | Nguyen | G06F 40/137 715/234 |
| 2018/0349250 A1* | 12/2018 | Debnath | G06F 11/3072 |
| 2020/0084335 A1* | 3/2020 | Guidotti | G06F 21/1063 |
| 2020/0159647 A1* | 5/2020 | Puszkiewicz | G06F 11/3664 |
| 2020/0348951 A1* | 11/2020 | Zohar | G06F 16/972 |
| 2020/0382295 A1* | 12/2020 | Howells | H04L 9/3066 |
| 2021/0081309 A1* | 3/2021 | Golubev | G06F 11/0772 |

* cited by examiner

*Primary Examiner* — Sang H Kim
(74) *Attorney, Agent, or Firm* — Thomas Horstemeyer, LLP

(57) ABSTRACT

Disclosed are various embodiments for efficiently identifying whether any expected user interface elements (e.g., informational components, containers, navigational components, input controls, labels, etc.) are missing from a rendered user interface. A user interface is generated and rendered by a client device according to user interface content data received from a content provider. User interface feature identifiers associated with user interface features included in the rendered user interface are identified and applied to one or more probabilistic data structure algorithms to generate a rendered feature probabilistic data structure digest representing the rendered user interface features. The rendered feature probabilistic data structure digest is compared with an expected feature digest to determine whether any expected user interface features are missing from the rendered user interface.

20 Claims, 9 Drawing Sheets

115

```
<div id="addToCart_feature_div" class="celwidget" data-feature-name="addToCart" data-csa-c-id="uasdpi-3k4wx6-cb5197-f329m7" data-cel-widget="addToCart_feature_div">
<div class="a-button-stack">
<span class="a-declarative" data-action="dp-pre-atc-declarative" data-dp-pre-atc-declarative="{}" id="atc-declarative">
<span id="submit.add-to-cart" class="a-button a-spacing-small a-button-primary a-button-icon"><span class="a-button-inner"><i class="a-icon a-icon-cart"></i><input id="add-to-cart-button" name="submit.add-to-cart" title="Add to Shopping Cart" data-hover="Select <b>__dims__</b> from the left<br> to add to Shopping Cart" class="a-button-input attach-dss-atc" type="button" value="Add to Cart" aria-labelledby="submit.add-to-cart-announce"><span id="submit.add-to-cart-announce" class="a-button-text" aria-hidden="true">Add to Cart</span></span></span>
</span>
</div>
<div class="dp-cif aok-hidden" data-feature-details="{"name":"atc","isInteractive":false}"></div>
<script type="text/javascript">(function(f) {var _np=(window.P._namespace("DetailPageBuyBoxTemplate"));if(_np.guardFatal){_np.guardFatal(f)(_np);}else{f(_np);}}(function(P) {
P.now().execute('dp-mark-atc',function(){
if (typeof window.markFeatureRender === 'function') {
window.markFeatureRender('atc',{isInteractive:false});
}
});
}));</script>
</div>
```

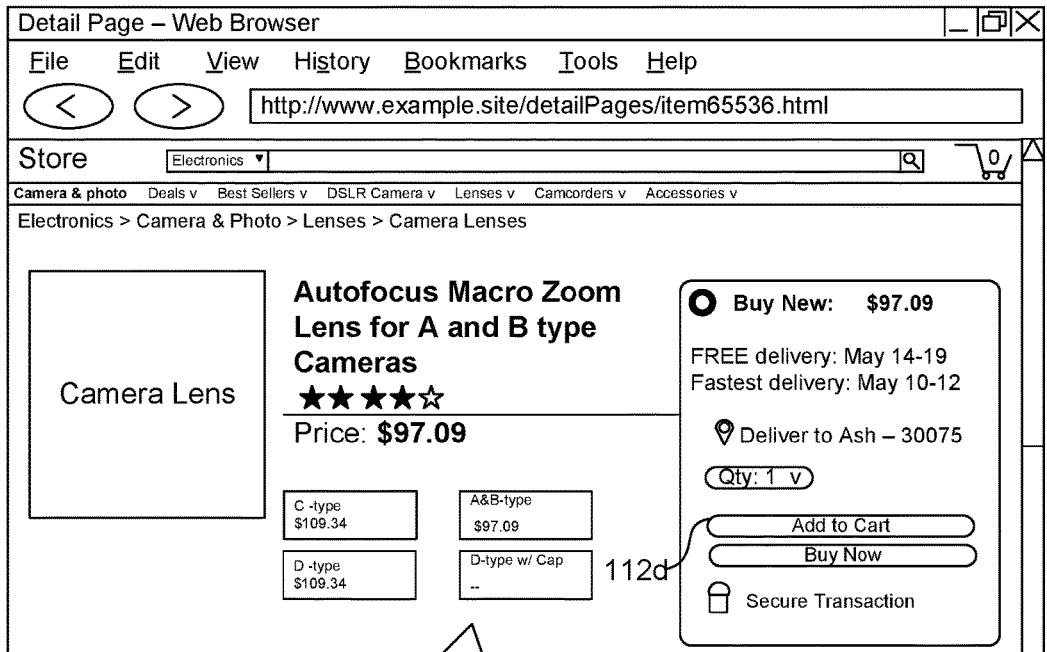

IDENTIFICATION OF MISSING CONTENT FEATURES IN RENDERED USER INTERFACES

BACKGROUND

Complex webpages can include federated content with a combination of several feature contents (e.g., user interface components including, selection components, item titles, etc.). For example, an item detail page may comprise about 700-800 features. In various instances, a webpage may be rendered with one or more missing features. A feature may be missing due to software bugs, data quality issues, execution environment issues, misconfigurations of configuration properties, and/or other issues. In various instances, it can be important to determine whether a given feature was successfully rendered to a client device (e.g., desktop/mobile/tablet). For example, a feature can be business critical, such as, for example, an add-to-cart component or an item title, and the lack of the feature can hamper a customer's buying decision and/or the ability of the customer to initiate purchase of the item.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2C include content data and examples of user interfaces associated with the content data, according to various embodiments of the present disclosure. FIG. 2A illustrates an example of a portion of content data. FIG. 2B illustrates an example user interface representing what is expected to be rendered according to the content data of FIG. 2A. FIG. 2B illustrates an example user interface representing a missing feature from what is expected according to the content data of FIG. 2A.

DETAILED DESCRIPTION

The present disclosure relates to efficiently identifying whether any expected user interface elements (e.g., informational components, containers, navigational components, input controls, labels, etc.) are missing from a rendered user interface. According to various examples, a missing user interface feature can be identified by comparing expected features with rendered features. In various embodiments, a content provider or other entity determines the user interface features that are expected to be rendered on the user interface and compares the expected user interface features with a representation of what is actually rendered by the client device. As such, when critical business features, such as, for example, an add-to-cart component, are determined to be missing, a manual and/or automated review of the content can be performed to identify and/or rectify the cause of the missing feature.

One example of feature verification of rendered content involves identifying all the rendered user interface features and sending the data associated with each of the rendered features (e.g., a list of feature identifiers) back to a server or content provider for verification. In various embodiments, the server or content provider compares the actual feature content data with the expected feature content data. However, in this example, the feature identifiers can comprise multiple digits (e.g., 3 to 4) which can result in a large data set (e.g., minimum of 2000 bytes) to be transferred from the client device to the server. The transfer of the large amount of data costs the end-user network bandwidth on the client side, as well as storage and handling costs on the server side.

According to various other examples, a space-efficient probabilistic data structure algorithm (e.g., bloom filter algorithm, cuckoo, exclusive-or (XOR), etc.) is used to create a rendered feature digest at the client-side. The rendered feature digest comprises an array of N bits (e.g., 1000 bits) that represent the set of user interface features included in the rendered feature content. In various embodiments, the rendered feature digest reduces the size of the transferred data to about 125 bytes. When compared with the example of transmitting the list of feature identifiers to the server, the use of a feature digest, that corresponds to a reduced representation of the rendered user interface features in the form of a probabilistic data structure, greatly reduces the amount of data transferred. As such, the bandwidth utilization of the client-side as well as the costs and storage concerns of the server-side are both minimized through the use of the rendered feature digest.

Figure 1:
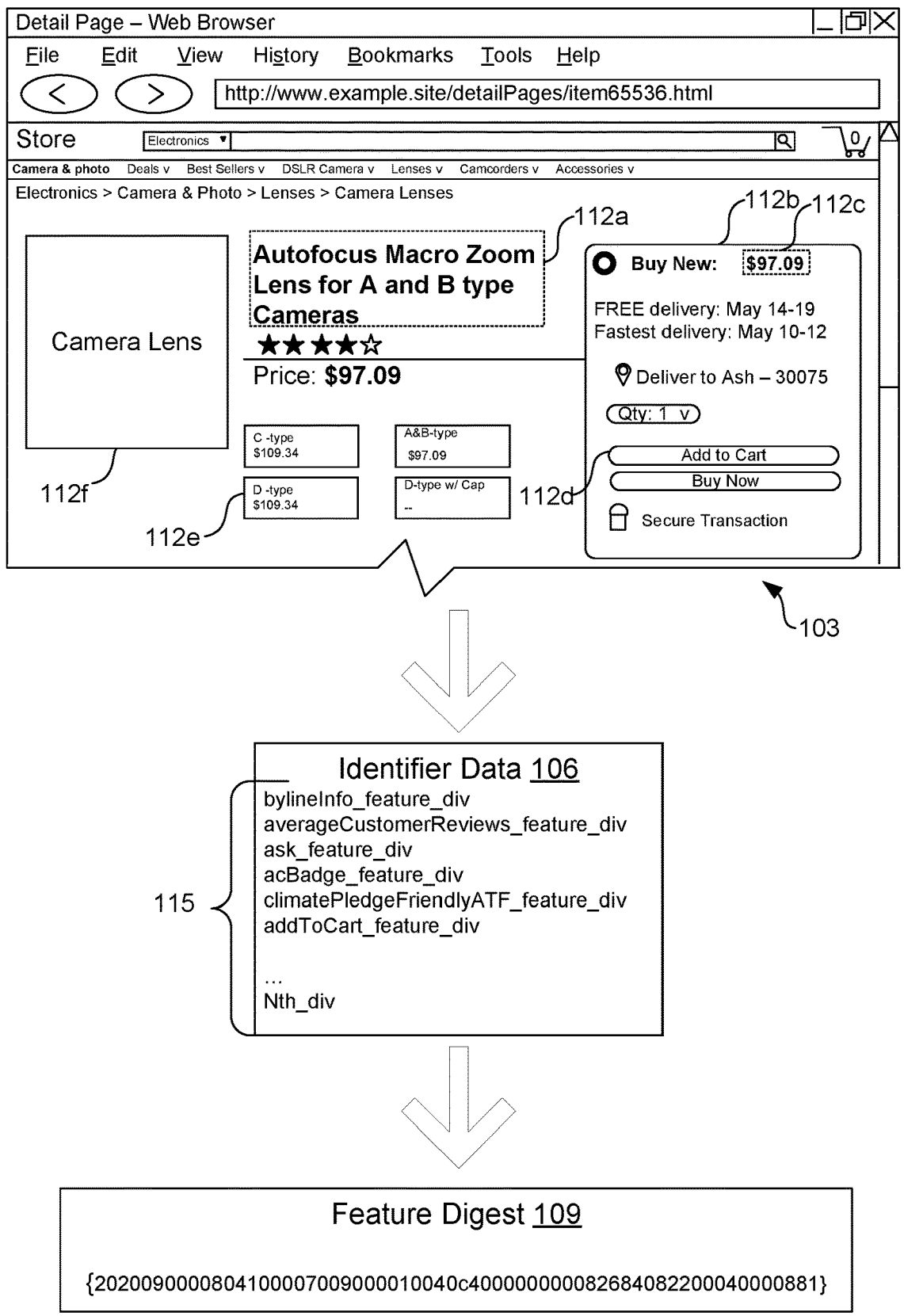
FIG. 1 is a drawing of an example of a rendered user interface along with identifier data including a list of feature identifiers and a feature digest created using the list of feature identifiers, according to various embodiments of the present disclosure.

Turning now to FIG. 1, shown is an example of a rendered user interface 103 associated with an item detail page for an item (e.g., camera lens) being offered for sale via an electronic commerce system. In addition to the rendered user interface 103, shown is an example of identifier data 106 and a feature digest 109 that, in various embodiments, are generated to represent the various user interface features 112 (e.g., 112a, 112b, 112c, 112d, 112e, 112f) rendered on the user interface 103. In various examples, a user interface feature 112 includes any type of user interface element that is presented to a user such as, for example, informational components (e.g., message boxes, icons, progress bars, notifications, labels etc.), input controls (e.g., buttons, text fields, toggles, checkboxes, etc.), navigational components (e.g., breadcrumbs, search fields, tags, pagination, carousels, icons, etc.), containers (e.g., menu bar, tool bar, panels, etc.), and/or other types of user interface element. It should be noted that while only a selection of features 112 are labeled on the user interface 103 of FIG. 1, the user interface 103 may comprise a large number (e.g., 800, 1000, etc.) of user interface features 112, as can be appreciated.

According to various embodiments, upon generating and rendering the user interface 103 based on user interface content (e.g., hypertext markup language (HTML) code), feature identifiers 115 from each of the rendered content user interface features 112 are identified. In some examples, the content provider provides user interface content for generating a user interface 103 and a user interface script that, when executed by the client device, detects the feature identifiers 115 associated with the user interface features 112 included on the rendered user interface 103. In some examples, the user interface script generates identifier data 106 (e.g., a log) that includes a listing of the identified feature identifiers 115. In some examples, the identifier data 106 is parsed and the feature identifiers 115 are detected and extracted from the identifier data 106. According to various examples, a feature identifier 115 comprises a numeric code, an alphanumeric code, and/or another type of unique identifier that can be assigned to a given user interface feature 112. As illustrated in the example of FIG. 1, the different types of feature identifiers 115 associated with the content rendered in the user interface 103 include "bylineInfo_feature_div," "ask_feature_div", "acBadge_feature_div," "addToCart_feature_div," and "averageCustomerReviews_feature_div." In the example of FIG. 1, the user interface 103 comprises N user interface features.

According to various examples, the identified feature identifiers 115 are used as inputs to a probabilistic data structure algorithm. The probabilistic data structure algorithm applies one or more hash functions to the feature identifiers 115 to create a rendered feature digest 109 that corresponds to a reduced representation of the rendered feature content. As shown in FIG. 1, the rendered feature digest 109 comprises an array of N bits (e.g., 20 bits, 30 bits) corresponding to the set of user interface features 112 included in the rendered feature content.

According to various examples, the rendered feature digest is transmitted from the client device to another computing device (e.g., a server) for feature verification. For example, upon receiving the feature digest 109, the server compares the rendered feature digest 109 to an expected feature digest 109 and validates if a particular user interface feature 112 was absent when it was supposed to be shown. If a user interface feature 112 is detected to be missing from the rendered content based on the comparison, a missing feature event is triggered and a notification is be generated to identify the missing user interface feature 112. According to various examples, the missing feature event initiates a manual and/or an automated review of the content and/or content provider system to determine the cause of the missing user interface feature 112 and/or rectify any issues related to the missing user interface feature 112.

Figure 2C:
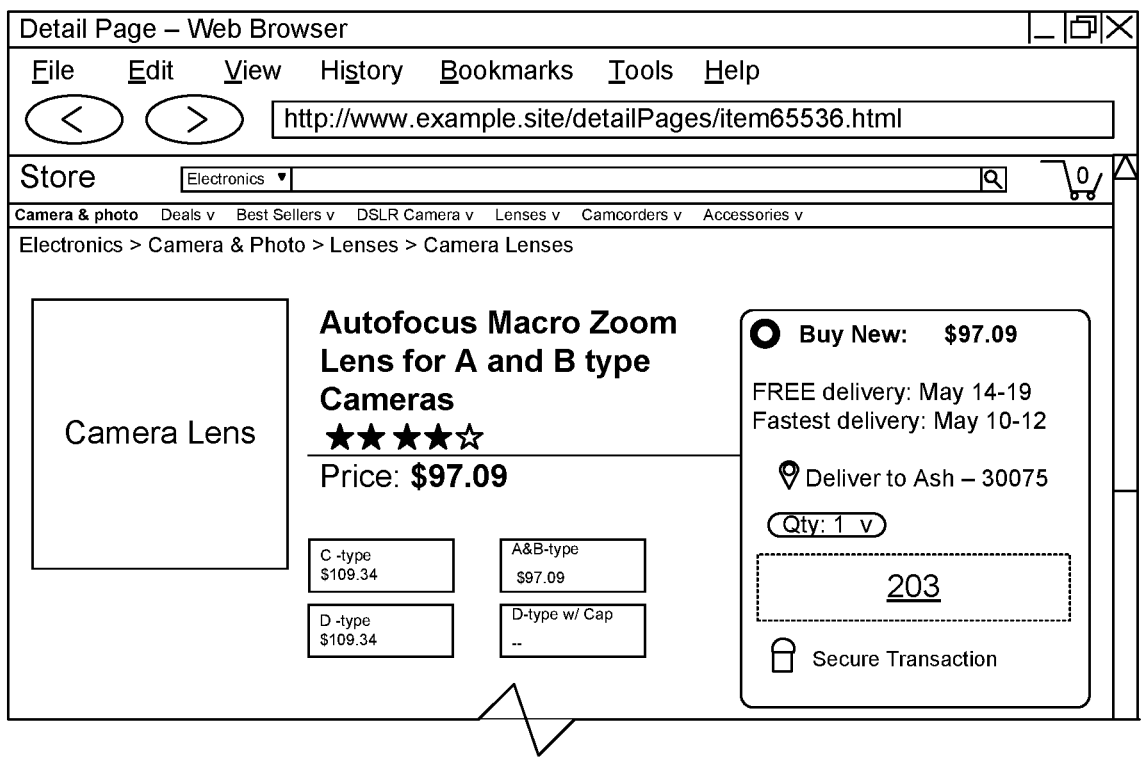

Turning now to FIG. 2A, shown is an example of user interface content data 200 including a reference to an "add-to-cart" user interface feature 112d. The user interface content data 200 comprises an example portion of HTML code that can be used by a browser or other type of client application to generate a user interface 103 rendered by a client device. As shown in FIG. 2A, the user interface content data 200 includes the feature identifier 115 (e.g., "addToCart_feature_div") that is associated with the user interface feature 112 (e.g., "Add to Cart component") to be included in the user interface 103. FIGS. 2B and 2C correspond to example user interfaces 103a, 103b that can be generated according to the user interface content data 200 of FIG. 2A.

In particular, FIG. 2B corresponds to an example of a user interface 103a that is expected to be rendered according to the user interface content data 200. As illustrated in FIG. 2B, an add-to-cart feature 112d is included in the user interface 103a. In contrast, the add-to-cart component 112d is missing in the user interface 103b of FIG. 2C, as denoted by the dashed-line box 203. This user interface feature 112 may be missing due to software bugs, data quality issues, execution environment issues, misconfigurations of configuration properties, and/or other issues. However, if one or more users are presented the user interface 103b of FIG. 2C where the add-to-cart component 112d is missing, the users may not be able to initiate a purchase of the item which may create business concerns for the merchant.

Since the user interface content data 200 includes the code for the user interface feature 112, the content provider may be unaware that the rendered user interface 103b differs from the expected user interface 103a. Indeed, in this particular example, it is critical to the business to be able to detect whether a given user interface feature 112 is actually rendered. If the user interface feature 112 is not rendered and the embodiments of the present disclosure are used to detect the missing user interface feature 112, a manual and/or automated review process can occur in a timely manner in hopes of rectifying the issue and minimizing potential business losses. Otherwise, the user interface feature 112 may continue to be missing on subsequent renderings of the user interface 103 without the knowledge of the content provider or other entity.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by using space-efficient probabilistic data structures to reduce the size of data transferred between devices for feature verification; (2) improving the user experience by identifying missing features and generating alerts that initiate a manual or automated review for rectifying the cause of a missing feature; (3) improving the functioning of the computing system through a more streamlined purchasing process that reduces user frustration when the user interface features are missing; and so forth. In the following discussion, a general description of the system and its components is provided, followed by a discussion of the operation of the same.

Figure 3:
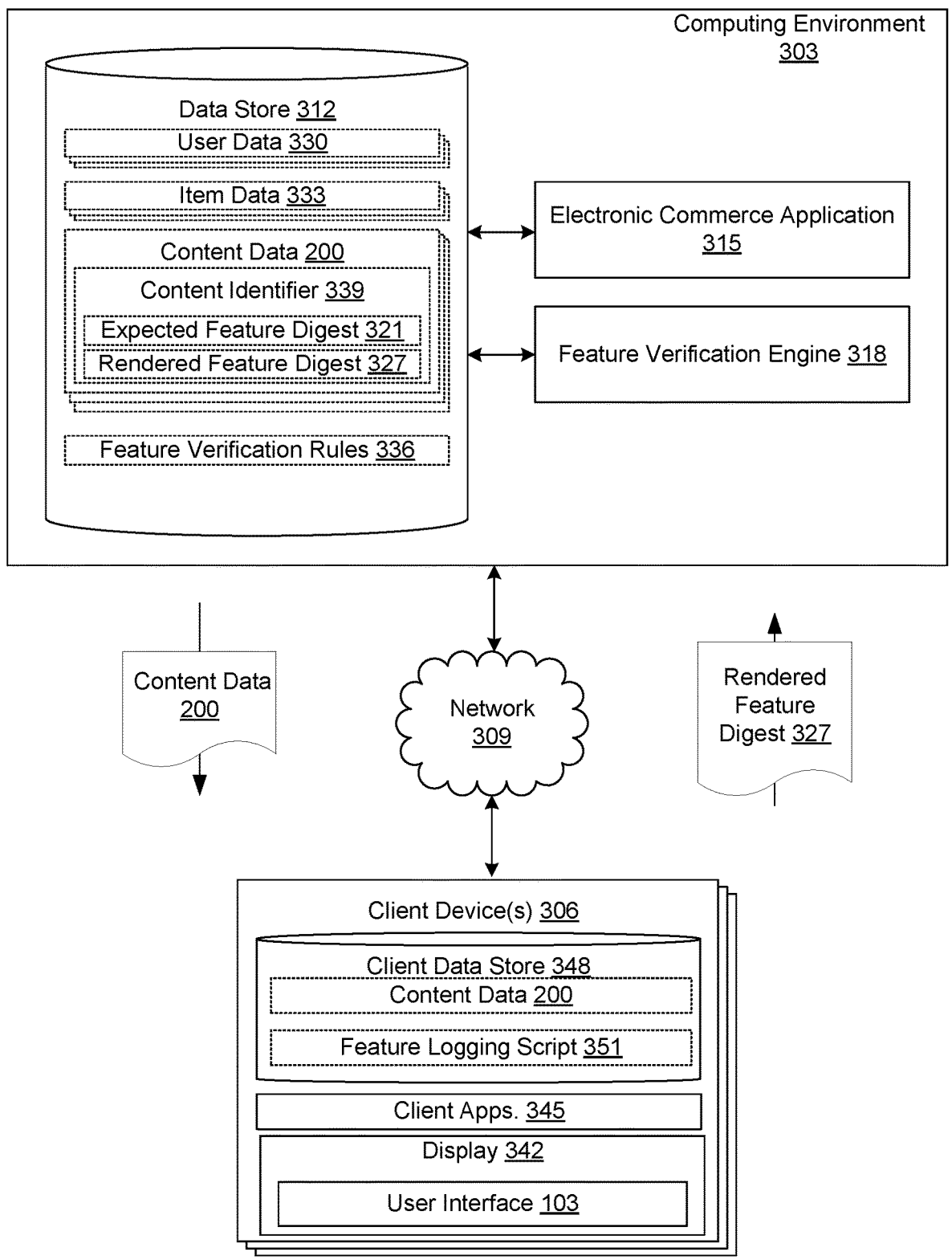
FIG. 3 is a schematic block diagram of a networked environment according to various embodiments of the present disclosure.

With reference to FIG. 3, shown is a networked environment 300 according to various embodiments. The networked environment 300 includes a computing environment 303 and one or more client devices 306, which are in data communication with each other via a network 309. The network 309 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource, and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. Also, various data is stored in a data store 312 that is accessible to the computing environment 303. The data store 312 may be representative of a plurality of data stores 312, as can be appreciated. The data stored in the data store 312, for example, is associated with the operation of the various applications and/or functional entities described below.

The components executed on the computing environment 303, for example, include an electronic commerce application 315, a feature verification engine 318, and other applications, services, processes, systems, engines, or functionality not discussed in detail herein. The electronic commerce application 315 is executed to facilitate the online sale, download, lease, rent, etc. of items from one or more electronic commerce systems over the network 309. Such items may include products, goods, services, digital content, and/or other items. The electronic commerce application 315 also performs various backend functions associated with the online presence of an electronic commerce system in order to facilitate the online purchase of items. For example, the electronic commerce application 315 generates network pages such as, for example, web pages and/or other types of network content that are provided to client devices 306 for the purposes of promoting and selecting items for purchase, rental, download, lease, or any other forms of consumption.

The feature verification engine 318 is executed to determine whether any user interface features 112 are missing from rendered user interfaces 103 and generate missing feature alerts, when applicable, to initiate a manual and/or automated review and/or rectification of any detected issues. In various examples, the feature verification engine 318 generates expected feature digests 321 by detecting the user interface features 112 that are expected to be rendered according to the user interface content data 200. For example, the feature verification engine 318 identifies the user interface feature identifiers 115 from the user interface content data 200 that is used to generate a given user interface 103. In various examples, the user interface content data 200 is parsed to identify the user interface feature identifiers 115 associated with the user interface features 112 to be rendered. The user interface feature identifiers 115 are applied as inputs to one or more probabilistic data structure algorithms to create an expected feature digest 321 that comprises a probabilistic data structure (e.g., a bloom filter) of an array of N bits (e.g., 1000 bits) that represents the set of user interface features 112 associated with the user interface feature identifiers 115.

In various examples, the feature verification engine 318 obtains a rendered feature digest 327 from the client device 306 that includes a probabilistic data structure of an array of N bits that represents the set of user interface features 112 that are included in the user interface 103 that is rendered on the client device 306. For example, the client device 306 generates a user interface 103 based on the content data 200 that is provided by the electronic commerce application 315 or another application in the computing environment 303. Upon generating the user interface 103 and rendering the user interface 103, the client device 306 generates the rendered feature digest 327 according to the rendered user interface 103 based on probabilistic data structure algorithms and then transmits the rendered feature digest 327 to the computing environment 303.

The feature verification engine 318 compares the rendered feature digest 327 with the expected feature digest 321 associated with the given network content data 200 to determine whether there is a match. If the feature verification engine 318 determines that the rendered feature digest 327 fails to match the expected feature digest 321, the feature verification engine 318 triggers a missing feature event. In some examples, the missing feature event is triggered in response to a determination to a threshold number of mismatches between the expected feature digest 321 and rendered feature digests 327 associated with multiple renderings of user interfaces 103 generated according to the content data 200. In some examples, the missing feature event comprises generating a missing feature notification that identifies the missing feature. The missing feature notification can be transmitted to a client device 306 associated with the content developer or other entity for further review. In some examples, the review is manual. In other examples, the review is automated. In one or more embodiments, the feature verification engine 318 determines the identity of the missing user interface feature 112 in response to a comparison of the expected feature digest 321 and the rendered feature digest 327 in view of the one or more probabilistic data structure algorithms.

The data stored in the data store 312 includes, for example, user data 330, item data 333, content data 200, feature verification rules 336, and potentially other data. The user data 330 includes various data collected from or generated by users and/or customers having accounts in an electronic commerce site facilitated by the electronic commerce application 315. The user data 330 may include interaction history data (e.g., purchase history, rating history, search history, browsing history, etc.), preference data, account address(es), payment instrument data, authentication information, and/or other data associated with a user or user account of the electronic commerce site.

The item data 333 comprises data regarding items offered through the electronic commerce application 315. Such items may include products, goods, services, digital content, and/or other items that can be offered for sale, lease, rent, download, etc. The items in the item data 333 may be organized according to a taxonomy of categories. For example, the items in the item data 333 may be categorized according to an item type with various item attributes further defining a placement of an item in the taxonomy. The item data 333 may include item attributes, an item identifier, descriptions, weights, prices, quantities available, export restrictions, customer reviews, customer ratings, images, videos, version information, availability information, shipping information, and/or other data. Item attributes can include specific characteristics that define a given item. For example, item attributes can include size, color, weight, packaging, quantity, freshness, ripeness, nutritional values, how the item is processed, brand, seasonality (e.g., fall, winter, spring, summer, holidays, etc.), associated activities (e.g., celebration, weddings, picnics, sporting events, etc.), hazardous classification, fragility, import/export restrictions, and/or other attributes as can be appreciated.

In various examples, the content data 200 includes various data employed by the electronic commerce application 315 and/or other type of application in generating user interfaces 103, and/or other network pages. It should be noted that although the examples of the present disclosure are directed towards content data 200 that provided by an electronic commerce application 315, the content data 200 can be generated by any type of application that serves up network pages such as, for example, web pages and/or other types of network content to client devices 306. The network content data 200 may include hypertext markup language (HTML), extensible markup language (XML), cascading style sheets (CSS), images, text, audio, video, templates, and/or other data.

According to various examples, the content data 200 is associated with a content identifier 339. In various embodiments, the content data 200 corresponds to different content that is served up to one or more client devices 306. For example, content data 200 may include content for each item detail page for a given item offered for sale via the electronic commerce application 315. According to various examples, a content identifier 339 is associated with the different types of content data 200 to uniquely identify the content being provided. According to various examples, the content identifier 339 comprises a numeric code, an alphanumeric code, or another type of identifier as can be appreciated.

According to various examples, the content identifier 339 is associated with the expected feature digest 321 for content data 200 of a given user interface 103. The expected feature digest 321 comprises a probabilistic data structure of an array of N bits that represents the set of user interface features 112 that are expected to be included in a user interface 103 that is rendered on the client device 306. The expected feature digest 321 is stored in the data store 312 and associated with the content identifier 339 upon creation. In various examples, the feature verification engine 318 obtains the expected feature digest 321 from the client device 306 based on the content identifier 339 that is included in a verification request along with a rendered feature digest 327.

According to various examples, the feature verification engine 318 stores the received rendered feature digest 327 in the data store 312 upon receipt from the client device 306. The rendered feature digest 327 comprises a probabilistic data structure of an array of N bits that represents the set of user interface features 112 that are included in a user interface 103 that is rendered on the client device 306. As a user interface 103 associated with the content data 200 can be generated and rendered on multiple client devices 306, the feature verification engine 318 can store the rendered feature digests 327 that are associated with renderings on the multiple client devices 306. In various examples, the feature verification engine 318 tracks the number of mismatches between the rendered feature digests 327 and the expected feature digests 321 and triggers a missing feature event in response to determining that a given feature identifier 115 has been missing from a threshold number of renderings.

The feature verification rules 336 include rules, models, and/or configuration data for the various algorithms or approaches employed by the feature verification engine 318. For example, the feature verification rules 336 can include the various models and/or probabilistic data structure algorithms used by the feature verification engine 318 in generating the expected feature digests 321 and comparing the expected feature digests 321 with the rendered feature digests 327. In addition, the feature verification rules 336 include threshold values used by the feature verification engine 318 in determining whether to trigger a missing feature event.

The client device 306 is representative of a plurality of client devices that may be coupled to the network 309. The client device 306 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 306 may include a display 342. The display 342 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 306 may be configured to execute various applications such as a client application 345 and/or other applications. The client application 345 may be executed in a client device 306, for example, to access network content served up by the computing environment 303 and/or other servers, thereby rendering a user interface 103 on the display 342. To this end, the client application 345 may comprise, for example, a browser, a dedicated application, etc., and the user interface 103 may comprise a network page, an application screen, etc. The client device 306 may be configured to execute applications beyond the client application 345 such as, for example, email applications, social networking applications, word processors, spreadsheets, and/or other applications.

Also, various data is stored in the client data store 348 that is accessible to the client device 306. The client data store 348 may be representative of a plurality of data stores as can be appreciated. The data stored in the client data store 348, for example, is associated with the operation of various applications and/or functional entities described herein. The client data store 348 may store data received from the computing environment 303, such as content data 200, a feature logging script 351, and other data as can be appreciated. In various examples, the feature logging script 351 is provided by the computing environment 303 along with the content data 200 and is configured to identify rendered user interface features 112 included in the user interface 103 associated with the content data 200 and generated by the client device 306. For examples, the feature logging script 351 can be executed by the client application 345 upon rendering of the generated user interface 103. In some examples, the feature logging script 351 generates identifier data 106 that includes a listing of the user interface feature identifiers 115 associated with the rendered user interface features 112 in the user interface 103.

In various examples, the feature logging script 351 is configured to extract the user interface feature identifiers 115 from the identifier data 106 and apply the user interface feature identifiers 115 to one or more probabilistic data structure algorithms to generate a rendered feature digest 327 that corresponds to a reduced size representation of the user interface features 112 that are included in the user interface 103 that is rendered by the client device 306.

Figure 4:
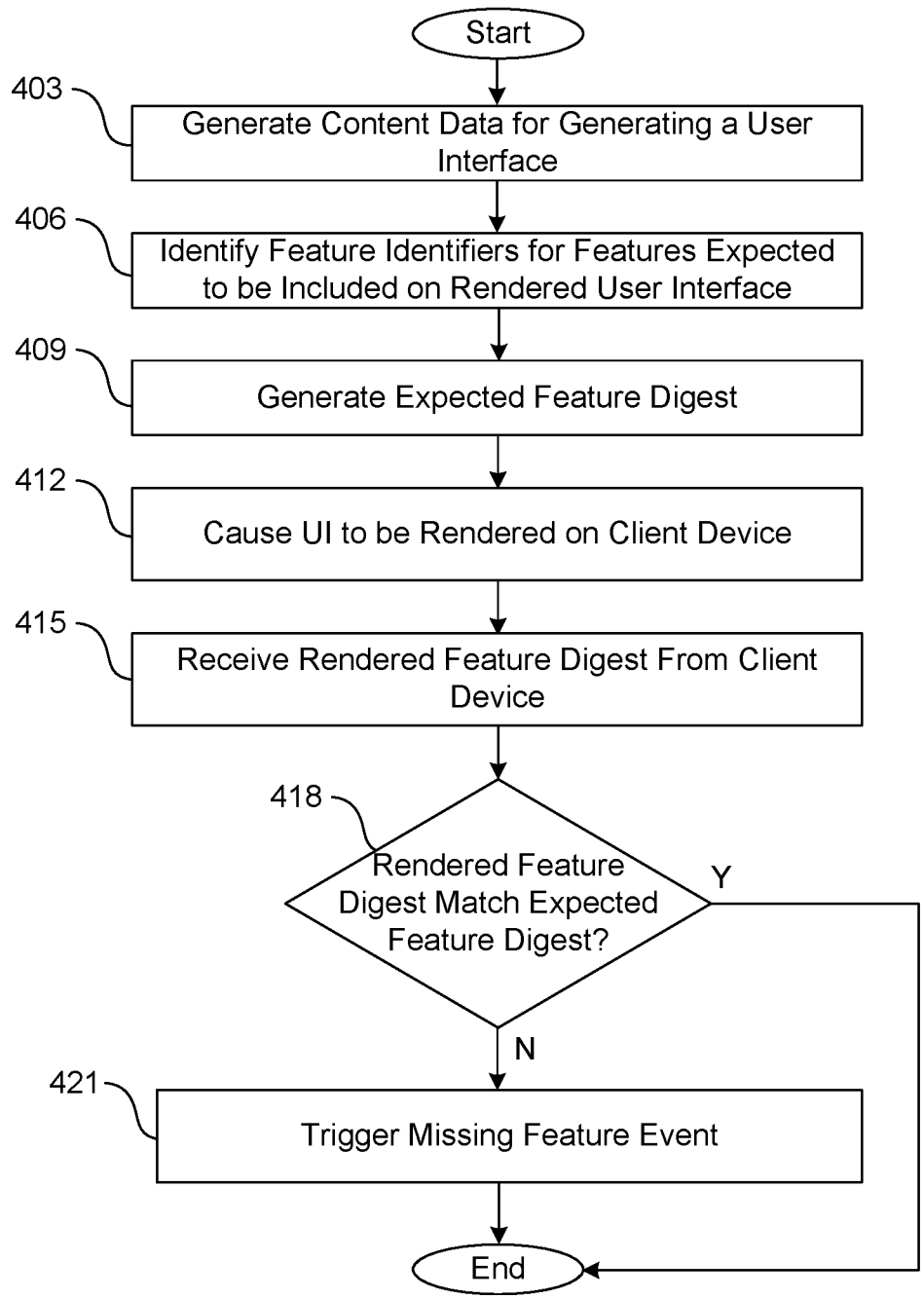
FIG. 4 is a flowchart illustrating one example of functionality implemented as portions of an electronic commerce application and feature verification engine executed in a computing environment in the networked environment of FIG. 3 according to various embodiments of the present disclosure.

Next, a general description of the operation of the various components of the networked environment 300 is provided with reference to FIGS. 4-7. To begin, FIG. 4 illustrates a flowchart 400 that provides one example of the operations of portions of the electronic commerce application 315 and the feature verification engine 318 according to various embodiments. It is understood that the flowchart of FIG. 4 provides merely an example of the many different types of functional arrangements that may be employed to implement the operation of portions of the electronic commerce application 315 and the feature verification engine 318 as described herein. As an alternative, the flowchart 400 of FIG. 4 may be viewed as depicting an example of elements of a method implemented in the computing environment 303 (FIG. 3) according to one or more embodiments.

Beginning with box 403, the electronic commerce application 315 generates content data 200 for a user interface 103 to be rendered on a client device 306. According to various examples, the content data 200 comprises hypertext markup language (HTML), extensible markup language (XML), cascading style sheets (CSS), images, text, audio, video, templates, and/or other data. The content data 200 defines the content that is to be included in a user interface 103 that is rendered on a client device 306. In particular, the content data 200 defines the user interface features 112 that are included in a particular user interface 103. In the example of an item detail page, the content data 200 defines the user interface features 112 associated with the given item (e.g., title, ratings, add-to-cart component, price, description, etc.) and defines the format and/or layout associated with the presentation of user interface features 112 included in a rendered user interface 103. In some examples, the content data 200 is pre-generated and stored in the data store 312. In other examples, the content data 200 is dynamically generated in response to a request for given content via interactions with the electronic commerce application 315.

At box 406, the feature verification engine 318 identifies feature identifiers 115 for user interface features 112 that are expected to be included on a rendered user interface 103 associated with the content data 200. In various examples, the feature verification engine 318 parses or otherwise analyzes the content data 200 to detect the user interface feature identifiers 115 for the user interface features 112 defined by the content data 200. In some embodiments, the feature verification engine 318 parses the content data 200 for feature identifiers 115 based on characteristics associated with the feature identifiers 115. For example, in the example of FIG. 1, the feature identifiers 115 all include "feature_div." In this example, the feature verification engine 318 identifies the feature identifiers 115 in response to detecting "feature_div" in the content data 200.

At box 409, the feature verification engine 318 generates the expected feature digest 321. In various embodiments, the feature verification engine 318 applies a listing or an array of the identified feature identifiers 115 as inputs to one or more probabilistic data structure algorithms included in the feature verification rules 336. As can be appreciated, the probabilistic data structure algorithms comprise hashing functions which hash the identified feature identifiers 115 to form a probabilistic data structure that comprises an array of N bits (e.g., 1000 bits etc.) that represents the set of user interface features 112 that are expected to be included in a user interface 103 associated with the content data 200. The probabilistic data structure corresponds to the expected feature digest 321. Upon creation, the feature verification engine 318 stores the expected feature digest 321 in association with a content identifier 339 of the expected feature digest 321.

At box 412, the electronic commerce application 315 causes a user interface 103 associated with the network content data 200 to be rendered on the client device 306. In one or more examples, the electronic commerce application 315 transmits, to the client device 306, the content data 200 comprising user interface code that is executable by the client application 345 to generate and render the user interface 103 on the client device 306. In other examples, the electronic commerce application 315 transmits the generated user interface 103 to the client device 306 for rendering. For example, the electronic commerce application 315 sends data associated with the generated user interface 103 in response to an application programming interface (API) call from the client application 345.

In some examples, the electronic commerce further transmits a feature logging script 351 to the client device 306. The feature logging script 351 is configured to identify the rendered user interface feature identifiers 115 in a rendered user interface 103. In some examples, the feature logging script 351 is further configured to monitor user interactions with the user interface 103 and transmit user interaction data back to the computing environment 303.

At box 415, the feature verification engine 318 receives a rendered feature digest 327 from the client device 306. The rendered feature digest 327 comprises a probabilistic data structure of an array of N bits that represents the set of user interface features 112 that are included in the user interface 103 that is rendered on the client device 306. The rendered feature digest 327 is created by the client application 345 of the client device 306 based on the identification of the feature identifiers 115 identified by the feature logging script 351. In various examples, the feature verification engine 318 further receives a content identifier 339 that is associated with the content data 200 and the rendered user interface 103.

At box 418, the feature verification engine 318 compares the rendered feature digest 327 with the expected feature digest 321 to determine if the two digests match. For example, the feature verification engine 318 obtains the expected feature digest 321 from the data store 312 according to the content identifier 339 that is received with the rendered feature digest 327. In various examples, the feature verification engine 318 determines whether the set of bits in the rendered feature digest 327 matches the set of bits in the expected feature digest 321. If the rendered feature digest 327 matches the expected feature digest 321, this portion of the process proceeds to competition. Otherwise, the feature verification engine 318 proceeds to box 421.

At box 421, the feature verification engine 318 triggers a missing feature event. In some examples, the missing feature event is triggered in response to a determination to a threshold number of mismatches between the expected feature digest 321 and rendered feature digests 327 associated with multiple renderings of user interfaces 103 generated according to the content data 200. In some examples, the missing feature event comprises generating a missing feature notification that identifies the missing feature. The missing feature notification can be transmitted to a client device 306 associated with the content developer or another entity for further review. In some examples, the review is manual. In other examples, the review is automated. In one or more embodiments, the feature verification engine 318 determines the identity of the missing user interface feature 112 in response to a comparison of the expected feature digest 321 and the rendered feature digest 327 in view of the one or more probabilistic data structure algorithms. Upon triggering the missing feature event, this portion of the process proceeds to completion.

Figure 5:
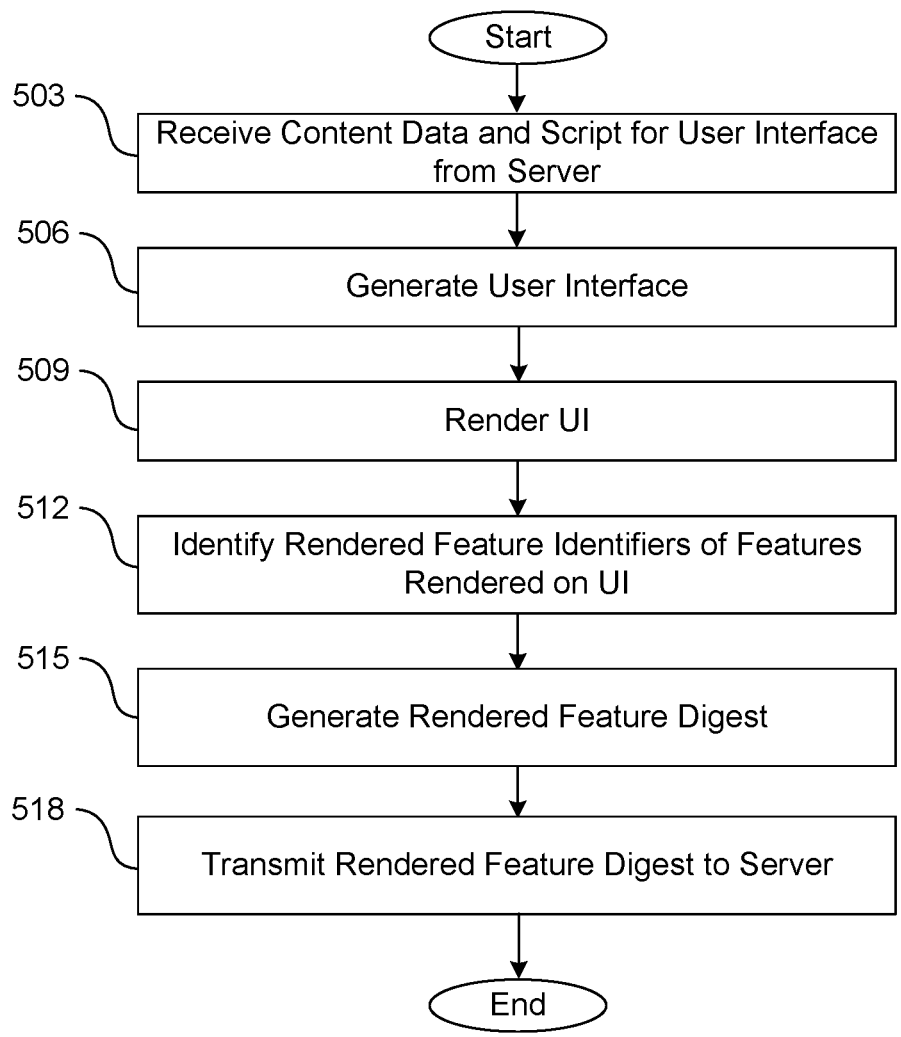
FIG. 5 is a flowchart illustrating one example of functionality implemented as portions of a client application executed in a client device in the networked environment of FIG. 3 according to various embodiments of the present disclosure.

Referring next to FIG. 5, shown is a flowchart 500 that provides one example of the operation of a portion of the client application 345 according to various embodiments. It is understood that the flowchart of FIG. 5 provides merely an example of the many different types of functional arrangements that may be employed to implement the operation of the portion of the client application 345 as described herein. As an alternative, the flowchart 500 of FIG. 5 may be viewed as depicting an example of elements of a method implemented in the client device 306 (FIG. 3) according to one or more embodiments.

Beginning with box 503, the client application 345 receives content data 200 and a feature logging script 351 from the computing environment 303 according to various embodiments. In some examples, the client application 345 receives the content data 200 in response to a request for content via interactions with the client application 345. For example, a user may be interacting with the electronic commerce application 315 and request to view a particular network page (e.g., item detail page) associated with the electronic commerce application 315. In response to sending a request to view the particular network page, the client application 345 receives the content data 200 from the computing environment 303. In other examples, the content data 200 is received following an opening of the client application 234.

At box 506, the client application 345 generates a user interface 103 according to the content data 200 received from the computing environment 303. The content data 200 defines the user interface features 112 to be included in the user interface 103 and defines the format and/or layout associated with the presentation of user interface features 112 included in a rendered user interface 103. The client application 345 generates the user interface 103 as defined by the content data 200. In various examples, the content data 200 includes a user interface code that is executable by the client application 345 to facilitate the generation of the user interface 103 by the client application 345.

At box 509, the client application 345 renders the user interface 103. For example, the client application 345 renders the user interface 103 on a display 342 of the client device 306. Accordingly, the user interacting with the client application 345 is presented a rendered version of the user interface 103 and is able to interact with the user interface 103, as can be appreciated.

At box 512, the client application 345 identifies the rendered feature identifiers 115 of the user interface features 112 rendered on the user interface 103. According to various examples, the client application 345 executes the feature logging script 351 which is configured to detect the feature identifiers 115 of the user interface features 112 that are rendered on the user interface 103. In some examples, the feature logging script 351 generates identifier data 106 that includes a listing of the feature identifiers 115 of the user interface features 112 rendered on the user interface 103. In various examples, the client application 345 parses the identifier data 106 to identify the feature identifiers 115. In other examples, the feature logging script 351 provides a listing or an array of the feature identifiers 115 to the client application 345.

At box 515, the client application 345 generates the rendered feature digest 327. The rendered feature digest 327 comprises a probabilistic data structure of an array of N bits that represents the set of user interface features 112 that are included in the user interface 103 that is rendered on the client device 306. According to various examples, the rendered feature digest 327 is generated by applying the feature identifiers 115 to one or more probabilistic data structure algorithms. The probabilistic data structure algorithms apply one or more hash functions to the feature identifiers 115 to create a rendered feature digest 327 that corresponds to a representation of the rendered feature content. According to various examples, a data size of the rendered feature digest 327 is significantly less than a data size of a listing of the feature identifiers 115. For example, for a user interface that includes eight hundred (800) features, the rendered feature digest 327 of 1000 bytes corresponding to the eight hundred features is significantly less than a listing of the eight hundred feature identifiers 115 which comprises a large data set of at least 30,000 bytes.

At box 518, the client application 345 transmits the rendered feature digest 327 to the computing environment 303. The rendered feature digest 327 is transmitted to the computing environment 303 to allow for feature verification by the feature verification engine 318. By performing the feature verification, missing features on rendered user interfaces 103 can be identified and rectified to avoid significant disruption. For example, by being able to identify a missing add-to-cart feature 112d (FIG. 1), critical business concerns associated with customers being unable to initiate a purchase of a particular item can be identified and rectified. Further, by being able to transmit the rendered feature digest 327 instead of a data set including a listing of feature identifiers 115, the bandwidth utilization of the client-side as well as the costs and storage concerns of the server-side are both be minimized. Upon transmitting the rendered feature digest 327 to the computing environment 303, this portion of the process proceeds to completion.

Figure 6:
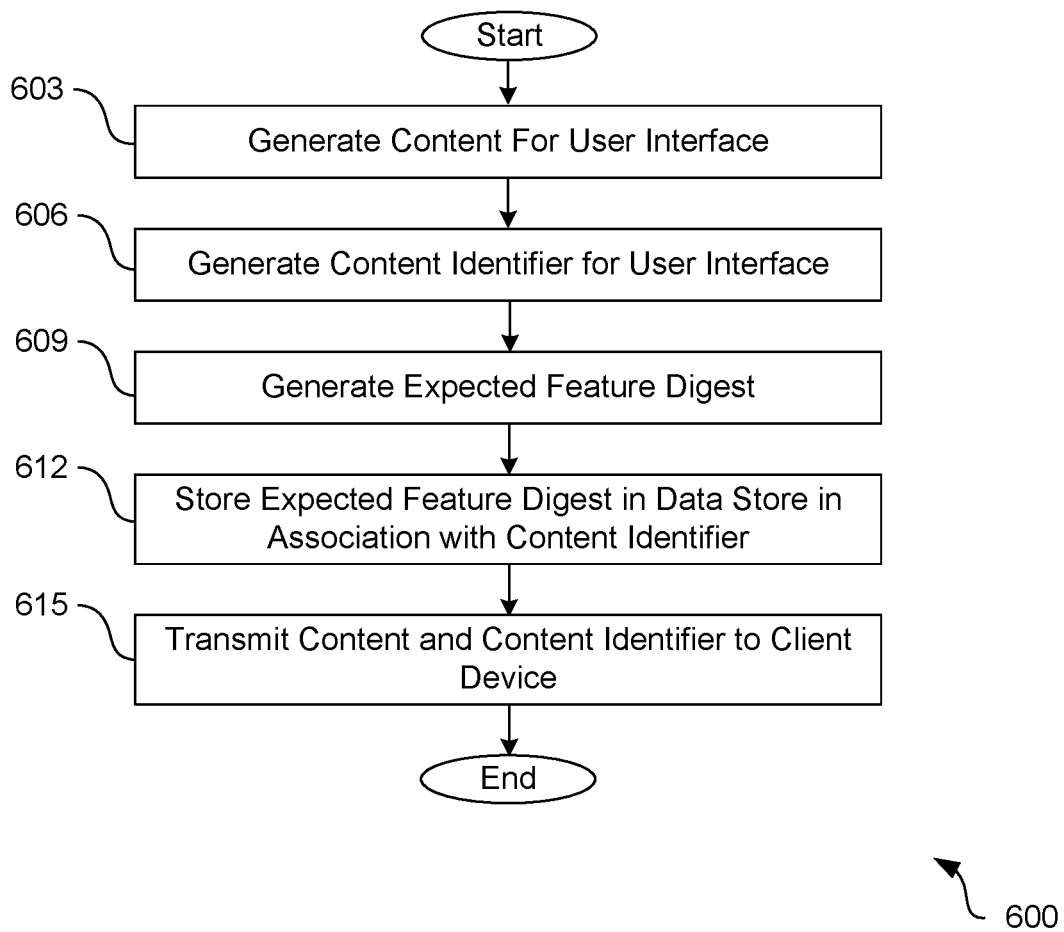
FIGS. 6 and 7 are flowcharts illustrating examples of functionality implemented as portions of an electronic commerce application and feature verification engine executed in a computing environment in the networked environment of FIG. 3 according to various embodiments of the present disclosure.

Referring next to FIG. 6, shown is a flowchart that provides one example of the operations of portions of the electronic commerce application 315 and the feature verification engine 318 according to various embodiments. It is understood that the flowchart 600 of FIG. 6 provides merely an example of the many different types of functional arrangements that may be employed to implement the operation of portions of the electronic commerce application 315 and the feature verification engine 318 as described herein. As an alternative, the flowchart 600 of FIG. 6 may be viewed as depicting an example of elements of a method implemented in the computing environment 303 (FIG. 3) according to one or more embodiments.

Beginning with box 603, the electronic commerce application 315 generates content data 200 for a user interface 103 to be rendered on a client device 306. According to various examples, the content data 200 comprises hypertext markup language (HTML), extensible markup language (XML), cascading style sheets (CSS), images, text, audio, video, templates, and/or other data. The content data 200 defines the content that is to be included in a user interface 103 that is rendered on a client device 306. In particular, the content data 200 defines the user interface features 112 that are included in a particular user interface 103. In the example of an item detail page, the content data 200 defines the user interface features 112 associated with the given item (e.g., title, ratings, add-to-cart component, price, description, etc.) and defines the format and/or layout associated with the presentation of user interface features 112 included in a rendered user interface 103. In some examples, the content data 200 is pre-generated and stored in the data store 312. In other examples, the content data 200 is dynamically generated in response to a request for given content via interactions with the electronic commerce application 315.

At box 606, the electronic commerce application 315 generates a content identifier 339 for the content data 200. According to various examples, a content identifier 339 is associated with the different types of content data 200 to uniquely identify the content being provided. According to various examples, the content identifier 339 comprises a numeric code, an alphanumeric code, or another type of identifier as can be appreciated.

At box 609, the feature verification engine 318 generates the expected feature digest 321. In various embodiments, the feature verification engine 318 applies a listing or an array of the identified feature identifiers 115 as inputs to one or more probabilistic data structure algorithms included in the feature verification rules 336. As can be appreciated, the probabilistic data structure algorithms comprise hashing functions which hash the identified feature identifiers 115 to form a probabilistic data structure that comprises an array of N bits (e.g., 20 bits, 30 bits, etc.) that represents the set of user interface features 112 that are expected to be included in a user interface 103 associated with the content data 200. The probabilistic data structure corresponds to the expected feature digest 321.

At box 612, the feature verification engine 318 stores the expected feature digest 321 in the data store 312 in association with the content identifier 339. The expected feature digest 321 is stored in association with the content identifier 339 to allow for access to the expected feature digest 321 upon receiving a rendered feature digest 327 from the client device 306 for feature verification. In particular, the feature verification engine 318 obtains the expected feature digest 321 from the data store 312 based on the content identifier 339 of the content data 200 of the rendered feature digest 327.

At box 615, the electronic commerce application 315 transmits the content data 200 and the corresponding content identifier 339 to the client device 306. The client device 306 uses the content data 200 to generate and render a user interface 103 associated with the content data 200. In various examples, the client application 345 of the client device 306 sends the rendered feature digest 327 along with the content identifier 339 to the feature verification engine 318 for feature verification. Thereafter, this portion of the process proceeds to completion.

Figure 7:
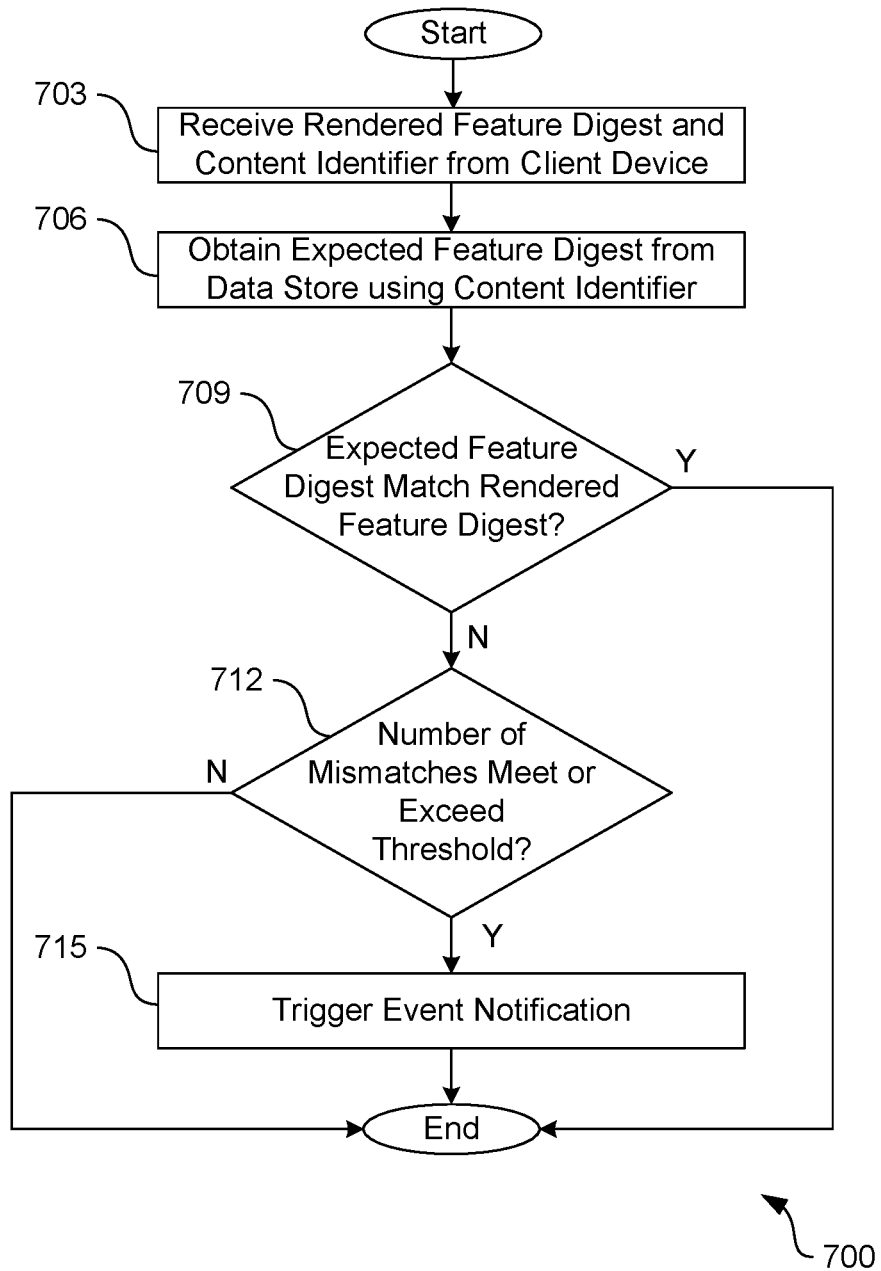

Referring next to FIG. 7, shown is a flowchart 700 that provides one example of the operations of portions of the electronic commerce application 315 and the feature verification engine 318 according to various embodiments. It is understood that the flowchart 700 of FIG. 7 provides merely an example of the many different types of functional arrangements that may be employed to implement the operation of portions of the electronic commerce application 315 and the feature verification engine 318 as described herein. As an alternative, the flowchart 700 of FIG. 7 may be viewed as depicting an example of elements of a method implemented in the computing environment 303 (FIG. 3) according to one or more embodiments.

Beginning with box 703, the feature verification engine 318 receives the rendered feature digest 327 and the content identifier 339 from the client device 306. The rendered feature digest 327 comprises a probabilistic data structure of an array of N bits that represents the set of user interface features 112 that are included in the user interface 103 that is rendered on the client device 306. The rendered feature digest 327 is created by the client application 345 of the client device 306 based on the identification of the feature identifiers 115 identified by the feature logging script 351. The content identifier 339 that is received with the rendered feature digest 327 is provided to correlate the rendered feature digest 327 with the corresponding content data 200 that was provided to the client device 306 to generate the rendered user interface 103. In various examples, the feature verification engine 318 stores the rendered feature digest 327 in association with the content identifier 339.

At box 706, the feature verification engine 318 obtains the expected feature digest 321 from the data store 312 based at least in part on the content identifier 339. In particular, the expected feature digest 321 that was created prior to the content data 200 being transferred to the client device 306 is stored in association with the content identifier 339. The expected feature digest 321 comprises a probabilistic data structure that comprises an array of N bits (e.g., 1000 bits, etc.) that represents the set of user interface features 112 that are expected to be included in a user interface 103 associated with the content data 200.

At box 709, the feature verification engine 318 determines whether the expected feature digest 321 matches the rendered feature digest 327. If the bits in the expected feature digest 321 match the bits in the rendered feature digest 327, the rendered user interface 103 is determined to match what is expected, and this portion of the process proceeds to completion. Otherwise, the feature verification engine 318 proceeds to box 712.

At box 712, the feature verification engine 318 determines whether a number of mismatches between the expected feature digest 321 and one or more received rendered feature digests 327 meets or exceeds a predefined threshold. In some examples, a single mismatch between an expected feature digest 321 and one or more received rendered feature digests 327 may not be of concern. However, assume that the predefined threshold is fifty, and if one hundred rendered feature digests 327 are received from client devices 306 all rendering user interfaces 103 and fifty of the rendered features digests 327 fail to match the expected feature digests 321, the feature verification engine 318 will determine that the number of mismatches meet the predefined threshold that is defined in the feature verification rules 336. If the number of mismatches fails to meet or exceed the predefined threshold, this portion of the process proceeds to completion. Otherwise, the feature verification engine 318 proceeds to box 715.

At box 715, the feature verification engine 318 triggers a missing feature event. In some examples, the missing feature event is triggered in response to a determination to a threshold number of mismatches between the expected feature digest 321 and rendered feature digests 327 associated with multiple renderings of user interfaces 103 generated according to the content data 200. In some examples, the missing feature event comprises generating a missing feature notification that identifies the missing feature. The missing feature notification can be transmitted to a client device 306 associated with the content developer or other entity for further review. In some examples, the review is manual. In other examples, the review is automated. In one or more embodiments, the feature verification engine 318 determines the identity of the missing user interface feature 112 in response to a comparison of the expected feature digest 321 and the rendered feature digest 327 in view of the one or more probabilistic data structure algorithm. Upon triggering the missing feature event, this portion of the process proceeds to completion.

Figure 8:
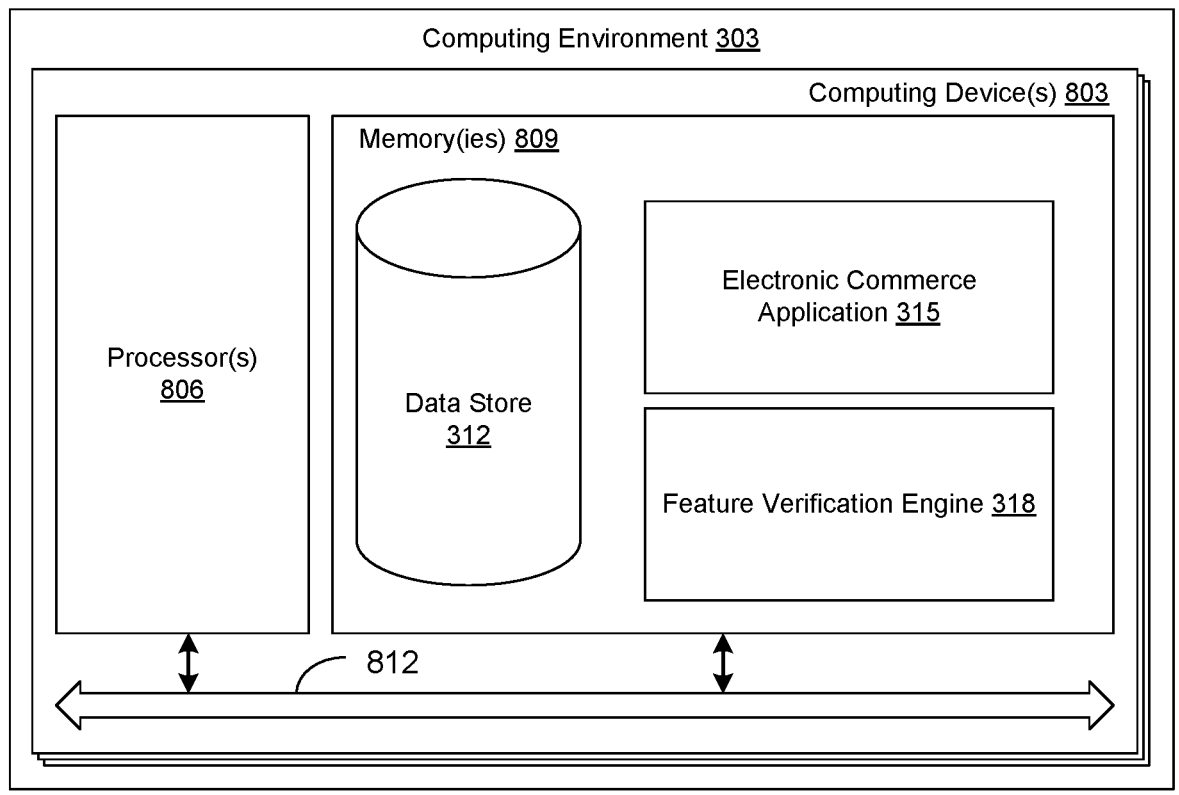
FIG. 8 is a schematic block diagram that provides one example illustration of a computing environment employed in the networked environment of FIG. 3 according to various embodiments of the present disclosure.

With reference to FIG. 8, shown is a schematic block diagram of the computing environment 303 according to an embodiment of the present disclosure. The computing environment 303 includes one or more computing devices 803. Each computing device 803 includes at least one processor circuit, for example, having a processor 806 and a memory 809, both of which are coupled to a local interface 812. To this end, each computing device 803 may comprise, for example, at least one server computer or like device. The local interface 812 may comprise, for example, a data bus with an accompanying address/control bus or other bus structure as can be appreciated.

Stored in the memory 809 are both data and several components that are executable by the processor 806. In particular, stored in the memory 809 and executable by the processor 806 are the electronic commerce application 315, the feature verification engine 318, and potentially other applications. Also stored in the memory 809 may be a data store 312 and other data. In addition, an operating system may be stored in the memory 809 and executable by the processor 806.

It is understood that there may be other applications that are stored in the memory 809 and are executable by the processor 806 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 809 and are executable by the processor 806. In this respect, the term "executable" means a program file that is in a form that can ultimately be run by the processor 806. Examples of executable programs may be, for example, a compiled program that can be translated into machine code in a format that can be loaded into a random access portion of the memory 809 and run by the processor 806, source code that may be expressed in proper format such as object code that is capable of being loaded into a random access portion of the memory 809 and executed by the processor 806, or source code that may be interpreted by another executable program to generate instructions in a random access portion of the memory 809 to be executed by the processor 806, etc. An executable program may be stored in any portion or component of the memory 809 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 809 is defined herein as including both volatile and nonvolatile memory and data storage components. Volatile components are those that do not retain data values upon loss of power. Nonvolatile components are those that retain data upon a loss of power. Thus, the memory 809 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 806 may represent multiple processors 806 and/or multiple processor cores and the memory 809 may represent multiple memories 809 that operate in parallel processing circuits, respectively. In such a case, the local interface 812 may be an appropriate network that facilitates communication between any two of the multiple processors 806, between any processor 806 and any of the memories 809, or between any two of the memories 809, etc. The local interface 812 may comprise additional systems designed to coordinate this communication, including, for example, performing load balancing. The processor 806 may be of electrical or of some other available construction.

Although the electronic commerce application 315, the feature verification engine 318, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-7 show the functionality and operation of an implementation of portions of the electronic commerce application 315, the feature verification engine 318, and the client application 345. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 806 in a computer system or other system. The machine code may be converted from the source code, etc. If embodied in hardware, each block may represent a circuit or a number of interconnected circuits to implement the specified logical function(s).

Although the flowcharts of FIGS. 4-7 show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 315 and the feature verification engine 318, that comprises software or code can be embodied in any non-transitory computer-readable medium for use by or in connection with an instruction execution system such as, for example, a processor 806 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 315 and the feature verification engine 318, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 803, or in multiple computing devices 803 in the same computing environment 303.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device; and
at least one application executable by the at least one computing device, wherein, when executed, the at least one application causes the at least one computing device to at least:
generate user interface content data for a user interface to be rendered on a client device;
identify a plurality of expected user interface feature identifiers based at least in part on the user interface content data, the plurality of expected user interface feature identifiers corresponding to a plurality of expected user interface features that are expected to be included in the user interface when rendered on the client device;
generate an expected feature digest based at least in part on a plurality of expected feature identifiers, the expected feature digest comprising a first array of bits corresponding to a reduced data size representation of a plurality of expected user interface features;
transmit the user interface content data to the client device;
receive a rendered feature digest from the client device, the rendered feature digest comprising a second array of bits corresponding to a reduced representation of a plurality of rendered user interface features that are included on the user interface that is rendered on the client device;
determine that at least one expected user interface feature is missing from the user interface rendered on the client device based at least in part on a comparison of the expected feature digest with the rendered feature digest; and
trigger a missing feature event in response to determining that the at least one expected user interface feature is missing from the user interface.

2. The system of claim 1, wherein the user interface content data further comprises a user interface script configured to identify a plurality of rendered content feature identifiers associated with the plurality of rendered user interface features included in the user interface that is rendered on the client device.

3. The system of claim 1, wherein triggering the missing feature event comprises generating a missing feature notification and, when executed, the at least one application further causes the at least one computing device to at least transmit the missing feature notification to another computing device for at least one of a manual review or an automated review.

4. The system of claim 1, wherein, when executed, the at least one application further causes the at least one computing device to at least:
generate a content identifier associated with the user interface content data; and
store the expected feature digest in a data store in association with the content identifier.

5. A non-transitory computer-readable medium embodying a program executable by at least one processor, wherein, the program, when executed, causes the at least one processor to at least:
generate a user interface based at least in part on user interface content data;
cause the user interface to be rendered;
identify a plurality of rendered user interface features associated with the rendered user interface;
generate a rendered feature digest comprising a probabilistic data structure that represents the plurality of rendered user interface features, a size of the rendered feature digest being based at least in part on a variable proportion of bits per feature; and
transmit the rendered feature digest to at least one computing device, the at least one computing being configured to identify whether one or more expected user interface features and a plurality of expected feature identifiers fail to be included in the plurality of rendered user interface features based at least in part on the rendered feature digest.

6. The non-transitory computer-readable medium of claim 5, wherein, when executed, the program further causes the at least one processor to at least receive the user interface content data from the at least one computing device.

7. The non-transitory computer-readable medium of claim 5, wherein the user interface content data comprises a script and, when executed, the program further causes the at least one processor to at least execute the script in response to rendering the user interface, the plurality of rendered user interface features being identified in response to execution of the script.

8. The non-transitory computer-readable medium of claim 7, wherein, when executed, the script generates a log comprising a plurality of rendered feature identifiers associated with the plurality of rendered user interface features.

9. The non-transitory computer-readable medium of claim 5, wherein, when executed, the program further causes the at least one processor to apply a plurality of rendered feature identifiers associated with the plurality of rendered user interface features to a probabilistic data structure algorithm to generate the rendered feature digest.

10. The non-transitory computer-readable medium of claim 5, wherein the user interface content data comprises at least one of cascading style sheet (CSS) code, extensible markup language (XML) code, hypertext markup language (HTML) code, and extensible HTML (XHTML) code.

11. The non-transitory computer-readable medium of claim 5, wherein the user interface comprises a first user interface generated in response to a user interaction with a second user interface.

12. The non-transitory computer-readable medium of claim 11, wherein the first user interface comprises an item detail page and the second user interface comprises a search results page.

13. The non-transitory computer-readable medium of claim 5, wherein, when executed, the program further causes the at least one processor to at least receive a missing feature event notification.

14. A method, comprising:
    generating user interface content data used by a client device to generate a user interface;
    receiving, by at least one computing device, a rendered feature digest from the client device, the rendered feature digest comprising a probabilistic data structure with an array of bits corresponding to a reduced representation of a plurality of rendered user interface features that are included on a user interface that is rendered on the client device;
    identifying at least one expected user interface feature expected to be included in the user interface based at least in part on the user interface content data;
    identifying, by the at least one computing device, the at least one expected user interface feature that is missing from the user interface rendered on the client device based at least in part on a comparison of an expected feature digest with the rendered feature digest, wherein the expected feature digest is based at least in part on a plurality of expected feature identifiers; and
    triggering, by the at least one computing device, a missing feature event based at least in part on the at least one expected user interface feature being missing from the user interface.

15. The method of claim 14, wherein the probabilistic data structure comprises a bloom filter.

16. The method of claim 14, wherein a data size of the rendered feature digest is less than a data size of an aggregation of a plurality of rendered content feature identifiers.

17. The method of claim 14, further comprising:
    receiving a content identifier with the rendered feature digest from the client device; and
    obtaining the expected feature digest from a data store based at least in part on the content identifier.

18. The method of claim 14, further comprising
    generating the expected feature digest based at least in part on a probabilistic data structure algorithm and the plurality of expected feature identifiers defined by the user interface content data.

19. The method of claim 18, wherein a portion of the user interface content data comprises a user interface script configured to identify the plurality of rendered user interface features that are included on the user interface rendered by the client device.

20. The method of claim 14, wherein the missing feature event comprises:
    generating a missing feature notification indicating at least one missing user interface feature; and
    transmitting the missing feature notification to another computing device for at least one of a manual review or an automated review.

* * * * *